(12) United States Patent
Reid et al.

(10) Patent No.: US 6,355,317 B1
(45) Date of Patent: Mar. 12, 2002

(54) THERMOPLASTIC MOISTURE CURE POLYURETHANES

(75) Inventors: Kevin J. Reid, White Bear Lake; Anne E. Spinks, Hugo; Jacqueline J. Jarocz, White Bear Lake, all of MN (US)

(73) Assignee: H. B. Fuller Licensing & Financing, Inc., St. Paul, MN (US)

( * ) Notice: Subject to any disclaimer, the term of this patent is extended or adjusted under 35 U.S.C. 154(b) by 0 days.

(21) Appl. No.: 08/878,520

(22) Filed: Jun. 19, 1997

(51) Int. Cl.[7] .............................. E06B 3/24; C08F 8/30
(52) U.S. Cl. ........................ 428/34; 525/125; 528/588; 52/786.13; 156/109
(58) Field of Search ..................... 428/34; 52/786.13, 52/786.1; 525/123, 125, 130; 156/109; 528/53; 524/588

(56) References Cited

U.S. PATENT DOCUMENTS

| | | |
|---|---|---|
| 3,642,936 A | 2/1972 | Hodge et al. |
| 3,645,925 A | 2/1972 | Speranza et al. |
| 3,661,808 A | 5/1972 | Kennedy |
| 3,707,521 A | 12/1972 | De Santis |
| 3,779,794 A | 12/1973 | De Santis |
| 4,198,254 A | 4/1980 | Leroche et al. |
| 4,217,254 A | 8/1980 | Legue |
| 4,357,744 A | 11/1982 | McKenzie et al. |
| 4,431,691 A | 2/1984 | Greenlee |
| 4,530,195 A | 7/1985 | Leopold |
| 4,546,723 A | 10/1985 | Leopold et al. |
| 4,593,068 A | 6/1986 | Hirose et al. |
| 4,628,582 A | 12/1986 | Leopold |
| 4,758,648 A | 7/1988 | Rizk et al. |
| 4,775,719 A * | 10/1988 | Markevka et al. .......... 525/125 |
| 4,780,520 A | 10/1988 | Rizk et al. |
| 4,808,255 A | 2/1989 | Markevka et al. |
| 4,820,368 A | 4/1989 | Markevka et al. |
| 4,820,745 A | 4/1989 | Muller et al. |
| 4,822,829 A | 4/1989 | Muller et al. |
| 4,831,799 A | 5/1989 | Glover et al. |
| 4,904,792 A | 2/1990 | Pioch |
| 5,088,258 A | 2/1992 | Schield et al. |
| 5,130,404 A | 7/1992 | Freeland |
| 5,189,073 A | 2/1993 | Humbert et al. |
| 5,250,607 A | 10/1993 | Comert et al. |
| 5,295,292 A | 3/1994 | Leopold |
| 5,313,761 A | 5/1994 | Leopold |
| 5,340,887 A | 8/1994 | Vincent et al. |
| 5,351,451 A | 10/1994 | Misera et al. |
| 5,361,476 A | 11/1994 | Leopold |
| 5,391,610 A | 2/1995 | Comert et al. |
| 5,441,808 A * | 8/1995 | Anderson et al. ........... 428/349 |
| 5,503,884 A | 4/1996 | Meyer et al. |
| 5,509,984 A | 4/1996 | Meyer et al. |
| 5,510,416 A | 4/1996 | Meyer et al. |
| 5,550,191 A | 8/1996 | Hung et al. |
| 5,559,169 A | 9/1996 | Belmont et al. |
| 5,631,318 A * | 5/1997 | Ito et al. ..................... 524/590 |

FOREIGN PATENT DOCUMENTS

| | | |
|---|---|---|
| EP | 0 420 638 A1 | 4/1991 |
| EP | 0 439 040 A1 | 7/1991 |
| EP | 0 455 400 A2 | 11/1991 |
| EP | 0 475 213 A1 | 3/1992 |
| EP | 0 492 824 A2 | 7/1992 |
| EP | 0 668 302 A1 | 8/1995 |
| JP | 5 117 619 | 9/1976 |
| WO | WO 94/29390 | 12/1994 |
| WO | WO 97/15619 | 5/1997 |

* cited by examiner

*Primary Examiner*—Donald J. Loney
(74) *Attorney, Agent, or Firm*—Bin Su

(57) ABSTRACT

This invention relates to a one-part thermoplastic moisture cure polyurethane composition, comprising a) at least one polyurethane prepolymer component; and b) at least one thermoplastic component. This composition is especially useful in the window area as a sealant.

23 Claims, No Drawings

THERMOPLASTIC MOISTURE CURE POLYURETHANES

FIELD OF THE INVENTION

This invention relates to a one part thermoplastic moisture cure polyurethane composition and a method of using this composition. This composition has primerless adhesion to glass and metal and is particularly well suited for use in the window area as an insulating glass sealant.

BACKGROUND OF THE INVENTION

Insulating glass (IG) units commonly have two panels of glass separated by a spacer. The two panels of glass are placed parallel to each other and a longitudinal spacer sealed around the perimeter of the glass maintains the gap therein. While this is the simplest configuration, other embodiments exist such as those with two spacers and three panels of glass. The spacers generally contain a desiccant to adsorb residual moisture which may enter the airspace during the life of the unit. There are various types of spacers including hollow metal and nonmetal tubes, preformed roll type spacers, metal U-channels, and various organic and inorganic foams.

The preformed roll type spacer comes in two types. One type contains a desiccating agent, an organic sealant and a metal foil and foamed elastomer which functions as both a vapor barrier and a spacer. The second type contains a desiccating agent and a strip of metal which functions as a vapor barrier. The second type requires that a sealant later be used. These rolls are stored in airtight containers until use, and are then applied to the glass units by hand. The organic sealant is often a polyisobutylene-polyisoprene rubber based system. A description of the second type of a preformed roll spacer may be found in U.S. Pat. No. 4,431,691 to Greenlee issued Feb. 14, 1984 and in U.S. Pat. No. 4,831,799 to Glover et al. issued May 23, 1989.

The hollow tube type of spacer contains a desiccant inside the metal tube. The tube may either be in multiple pieces requiring connectors at each corner which requires relatively more assembly, or it may be a single bendable piece requiring only one connector. The type of spacer utilizing folding corner connections is described in U.S. Pat. Nos. 4,530,195 issued Jul. 23, 1985 and 4,628,582 issued Dec. 16, 1986 to Leopold.

A third commercially used spacer is the metal U-channel spacer which is bent to provide a spacer frame having continuous corners, thereby relieving some of the labor required for assembly of the IG unit. The continuous channel allows for application of a desiccated matrix using conventional application equipment. This system may be found in U.S. Pat. Nos. 5,503,884 issued Apr. 2, 1996, 5,509,984 issued Apr. 23, 1996 and 5,510,416 issued Apr. 23, 1996 to Meyer et al. A description of the metal U-channel spacer may be found in U.S. Pat. No. 5,313,761 to Leopold issued May 24, 1994. Using the hollow tube spacer, the U-channel metal spacer or the preformed roll spacer requires the application of a sealant to adhere the glass panels to the spacer. Various types of sealants are currently used in the manufacture of IG units including both curing and non-curing systems. Liquid polysulphides, polyurethanes and silicones represent curing systems which are commonly used, while polybutylene-polyisoprene copolymer rubber based hot melt sealants are commonly used non-curing systems.

Liquid polysulphides and polyurethanes are generally two component systems comprising a base and a curing agent which are then mixed just prior to application to the glass. Silicones may be one component as well as two component systems. Two component systems require a set mix ratio, two-part mixing equipment and a cure time of between ½ hour to 4 hours or longer before the IG units can be moved onto the next manufacturing stage. These slow cure times can decrease the efficiency in the manufacturing process and can lower profitability. Furthermore, unexpected delays in the production process can result in these systems curing in the application equipment resulting in down time for clean up.

The advantages to using curing systems are higher ultimate bond strengths, better creep resistance and less susceptibility to glass slippage. Creep resistance is especially important after installation when the windows are in the vertical position in a building. Glass slippage, also known as glass movement can occur during shipping of the IG units.

Non-curing hot melt systems set faster and can overcome the disadvantage of having a slow cure time, but hot melts are more susceptible to fluctuations in ambient temperatures and may soften with high temperatures or stiffen with cold, and do not develop as high of ultimate bond strengths in comparison to the curing systems.

The sealants may be applied either by hand gunning or by automated three sided extrusion. The curing type systems are generally applied using the hand gun method because either they do not set fast enough or are not thixotropic enough for the fully automated three sided extrusion type lines. Hot melt systems are generally extruded although they may be applied by the hand gun method as well. The automated extrusion lines are a more efficient method of production and can lower manufacturing costs dramatically.

Sealants may be used in either a single seal construction or in a dual seal construction of the IG units. Single seal construction involves the application of only one type of sealant to all three sides of the spacer. A hot melt sealant is most commonly used for this construction, and in particular the hot melts are generally based on copolymers of polyisobutylene and polyisoprene. Curing systems may be used but this requires that the IG units be removed from the production lines until the system has cured enough to hold the unit together without slippage.

Dual seal construction involves application of first a primary sealant, usually a polyisobutylene based hot melt, which is extruded on two sides of the spacer. The glass panels are then bonded to each side of the spacer, and the area behind the spacer and between the two glass panels is then filled in with a secondary sealant which is usually a curing system. This system is advantageous because a fast rate of set can be achieved by employing a hot melt system, thereby increasing manufacturing efficiency. The polyisobutylene provides an immediate moisture barrier whereas the curing system contributes higher strength to the finished IG unit. A silicone sealant may not be used in the single seal construction because of higher moisture vapor transmission rates allowing the passage of moisture which accumulates between the glass panels. However, although this may be a more effective means of production, it is still not as efficient as using a fully automated extrusion system.

It is known in the hot melt adhesive art to blend polyurethanes with modifiers such as various polymers and tackifiers. U.S. Pat. Nos. 4,775,719 issued Oct. 4, 1988, U.S. Pat. No. 4,808,255 issued Feb. 28, 1989 and U.S. Pat. No. 4,820,368 issued Apr. 11, 1989 to Markevka et al. teach one-part systems which combine the characteristics of hot melt adhesives and curing polyurethane adhesives by blending various polymers and tackifiers with various urethane prepolymers. These systems are extrudable at elevated temperatures and allow for sufficient green strength from the hot melt portion of the system to form an initial bond quickly, and the cured polyurethane portion allows for a final rigid structural bond that is more impervious to temperature fluctuations than a hot melt adhesive.

U.S. Pat. No. 4,775,719 teaches a one-part thermally stable hot melt pressure sensitive moisture cure polyurethane composition in which a polyurethane prepolymer, which is the reaction product of a polyether polyol and an isocyanate compound, is blended with an ethylene vinyl monomer copolymer and a tackifying resin. U.S. Pat. No. 4,808,255 teaches blending a polyurethane prepolymer with an ethylene vinyl monomer copolymer and a tackifying resin. This invention differs from that described above in that the polyurethane prepolymer in this case is the reaction product of a polyester polyol and an isocyanate component. The polyester polyol may be produced from various carboxylic acids or dimer acids.

U.S. Pat. Nos. 4,820,368 teaches blending a polyurethane prepolymer, which is the reaction product of a polyalkylene diol or triol and an isocyanate compound, with either a block copolymer or an ethylene vinyl monomer copolymer and a tackifying resin. These polyalkylene compounds are based on polybutadiene and polyisoprene diols or triols or hydrogenated versions thereof.

U.S. Pat. No. 5,441,808 to Anderson et al. issued Aug. 15, 1995 teaches a polyurethane prepolymer which is the reaction product of a polyester polyether polyol and a polyisocyanate component. It is taught in this patent that other hot melt components such as thermoplastic polymers, tackifying resins, plasticizers, fillers, adhesion promoters such as silane, catalysts, antioxidants, UV absorbers and dyes may be added to the polyurethane prepolymer to impart further desirable properties such as tack, increased rate of set, stability, color and improved adhesion. The exemplified thermoplastic polymers of Anderson are vinyl polymers and ethylene acrylic polymers.

U.S. Pat. No. 5,250,607 issued Oct. 5, 1993 and U.S. Pat. No. 5,391,610 issued Feb. 21, 1995 to Comert et al. teach an interpenetrating polymer system comprising a mixture of a moisture cured prepolymer component and a plasticized elastomeric component which is non-reactive with the prepolymer component. It is suggested at column 3 line 20 that this system may be used without a plasticizer. The prepolymer backbone may be polyester, polyether or polybutadiene polyols or mixtures thereof. Primers are required to improve the adhesion of a sealant composition to a surface for polyurethane systems. Many primer compositions are known such as those found in WO 94/29390 filed Jun. 3, 1993, U.S. Pat. No. 3,707,521 issued Dec. 26, 1972 and U.S. Pat. No. 3,779,794 issued Dec. 18, 1973 both to De Santis.

EP 0,439,040 A1 filed Jan. 14, 1991 teaches a one-part acrylic urethane adhesive which comprises a polymerizable ethylenically unsaturated urethane polymer and a polymerizable ethylenically unsaturated acid, acid salt or acid anhydride which does not require a primer for bonding to metal and glass. The urethane has a site of unsaturation whereby the urethane will copolymerize with the unsaturated acid, acid salt or anhydride.

There remains a need for a one-part curing system having excellent adhesion to glass and metal. Further it would be advantageous to have a system requiring no surface priming. The present inventors have discovered a one-part system having a polyurethane component and a thermoplastic component that is easy to apply and requires no surface priming in order to obtain excellent adhesion.

SUMMARY OF THE INVENTION

The present invention relates to a one-part edge sealant comprising: a) a thermoplastic hot melt resin, said hot melt resin having a melt temperature of between approximately 125° F.–250° F. (about 50° C.–120° C.), and b) a silicon-containing atmospheric curing resin which polymerizes upon exposure to oxygen or water vapor in an ambient atmosphere. The atmospheric curing resin is combined with the thermoplastic hot melt resin as a single material whereby the sealant is in a liquid phase at a temperature above room temperature, reversibly solidifies upon cooling to room temperature and irreversibly solidifies upon subsequent exposure to ambient atmosphere.

The present invention further relates to a one-part edge sealant comprising: a) about 10%–90% by weight of the sealant of a thermoplastic hot melt resin wherein the hot melt resin comprises a compound selected from the group consisting of solid chlorinated paraffin, epoxidized soya oil, polyisobutylene, and mixtures thereof, and b) 5%–50% by weight of the sealant of an atmospheric curing resin wherein the atmospheric curing resin comprises a compound selected from the group consisting of an alkoxy silane terminated polyurethane, an organo functional silane, and mixtures thereof. The atmospheric curing resin is combined with the thermoplastic hot melt resin as a single material and the sealant is in a liquid phase at a temperature above room temperature, reversibly solidifies upon cooling to room temperature, and irreversibly solidifies upon subsequent exposure to ambient atmosphere.

The present invention further relates to a one-part thermoplastic moisture cure polyurethane composition comprising: a) a polyurethane prepolymer component comprising the reaction product of at least one isocyanate compound and at least one amorphous polyester polyol which is formed from a diol and a diacid; and b) at least one thermoplastic rubber component. Preferably, the diacid has a chain length of greater than about 10 carbon atoms.

This invention further relates to a method of sealing substrates comprising the steps of: a) applying the one-part thermoplastic moisture cure polyurethane composition onto a first substrate; b) contacting the adhesive of said first substrate with a second substrate and; c) allowing the one-part thermoplastic moisture cure composition to cure.

This invention further relates to a one-part thermoplastic moisture cure polyurethane composition comprising: a) at least one polyurethane prepolymer component which is the reaction product of at least one isocyanate compound and at least one dihydroxy polyol including polyester polyols, polyether polyols, polyalkylene polyols and mixtures thereof; and b) at least one thermoplastic component. This composition is characterized as having primerless adhesion to glass and metal. This composition can further comprise a silane adhesion promoter.

This system combines the benefit of ease of handling thermoplastic adhesives and the low moisture vapor transmission rate plus the benefit of the high bond strengths. This one-part system is fast setting and may be applied using automated hot melt extrusion equipment which increases production efficiency. Additionally this system has excellent hot and cold temperature resistance.

These compositions are further characterized as exhibiting excellent adhesion to glass and metal, requiring no primer before use. It has the advantages of being a one-part curable system but yet it can be applied using standard hot melt application methods such as linear extrusion.

These compositions are ideally suited for use as sealants in all types of applications.

This composition may further be used in the manufacture of IG units, and specifically for use as a IG sealant. It has excellent initial adhesion to the metal spacers used in the manufacture of insulated glass (IG) units. It resists sagging, deformation and is heat resealable before it has cured.

This invention further relates to an insulating glass unit having a first glazing pane maintained in a spaced apart relation with a second glazing pane by a spacer and having an edge sealant for the insulating glass unit whereby the edge sealant comprises: a) a thermoplastic hot melt resin having a melt temperature of between approximately 125° F.–250° F. (about 50° C.–120° C.) and b) an atmospheric curing resin which polymerizes upon a exposure to oxygen or water vapor in an ambient atmosphere, the atmospheric curing resin comprising a silicon-containing atmospheric curing resin. The atmospheric curing resin and the thermoplastic hot melt resin are combined as a single material and the sealant is in a liquid phase at a temperature above room temperature, reversibly solidifies upon cooling to room temperature and irreversibly solidifies upon subsequent exposure to ambient atmosphere.

This invention further relates to an insulating glass unit comprising a) at least one edge assembly; b) at least two glass panels; and c) a one-part sealant composition comprising at least one moisture curing component and at least one thermoplastic component. The sealant is disposed between the edge assembly and the glass panels and engages the edge assembly and the glass panels.

This invention further relates to an insulating glass unit comprising: a) at least one edge assembly; b) at least two glass panels; and c) at least one one-part thermoplastic moisture cure polyurethane sealant comprising: i) a polyurethane prepolymer component which is the reaction product of at least one isocyanate compound and at least one dihydroxy polyol selected from the group consisting of polyester polyols, polyether polyols, polyalkylene polyols, and mixtures thereof and ii) at least one thermoplastic component. The sealant engages the edge assembly and the glass panels.

These compositions may be used in either the single seal or dual seal construction of IG units, and may either be applied to the spacers using the hand gun method or the three sided extrusion method, or they may be used as the sealant component of the preformed roll type spacer.

DETAILED DESCRIPTIONS OF THE PREFERRED EMBODIMENTS

A preferable group of atmospheric curing resins comprise moisture cure polyurethanes, polydimethylsiloxanes, and mixtures thereof, some containing silicon functionalities. Some specific atmospheric curing resins include alkoxy, acetoxy, oxyamino silane terminated polyethers and polyether urethanes; alkyl siloxane polymers crosslinked with alkoxy, acetoxy, oxyamino organo functional silanes; moisture curable isocyanate functional polyoxyalkaline polymers and polyalkaline polymers; thiol functional polymers and oligomers such as polyethers, polyether urethanes and polythioethers.

More specifically, some prepolymers useful in manufacturing the one-part thermoplastic moisture cure polyurethane composition of the present invention include an isocyanate terminated prepolymer made by reacting an isocyanate compound with a dihydroxy polyol which can include polyester polyols, polyether polyols, polyalkylene polyols and mixtures thereof.

The isocyanate compounds useful herein include those described in U.S. Pat. Nos. 4,775,719 issued Oct. 4, 1988, U.S. Pat. No. 4,808,255 issued Feb. 28, 1989 and U.S. Pat. No. 4,820,368 issued Apr. 11, 1989 to Markevka et al. incorporated by reference herein. An example of a useful polyisocyanate compound is Isonate 2125M, pure diphenylmethane diisocyanate (MDI) manufactured by Dow Chemical Co. in Midland, Mich.

The polyester polyols useful herein include those described in U.S. Pat. No. 4,808,255 to Markevka et al. incorporated by reference herein.

The polyether polyols useful herein include those described in U.S. Pat. No. 5,441,808 to Anderson et al. issued Aug. 15, 1995 incorporated by reference herein. The polyalkylene polyols useful herein include those described in U.S. Pat. No. 4,820,368 to Markevka et al. incorporated by reference herein.

Polyols useful to the present invention are also described in Doyle, E. N., The *Development and Use of Polyurethane Products*, McGraw-Hill Book Co., 1971, pages 44 to 62.

The polyurethane prepolymers of the present invention are preferably manufactured by reacting isocyanate compounds with dihydroxy polyols including polyester polyols, polyether polyols, polyalkylene polyols and mixtures thereof. One specific embodiment is manufactured by reacting isocyanate compounds with amorphous polyester polyols which are formed from diols and diacids. The diacids preferably have a chain length of greater than about 10 carbon atoms. Some examples of useful polyester polyols are those including the reaction product of a dimer acid such as Empol™ 1061 or Empol™ 1018 both from the Emery Division of Henkel Corp. in Cincinnati, Ohio, and a neopentyl glycol, ethylene glycol, propylene glycol, cyclohexanel,4-butanediol and 1,6-hexanediol. Other diols may also be employed.

Optionally, catalysts may be utilized in the one-part thermoplastic moisture cure polyurethane composition of the present invention to improve curing speed without adversely affecting other physical properties such as green strength or thermal stability. Some useful catalysts include those represented by the following general structures:

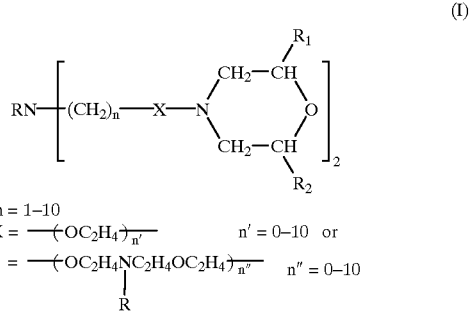

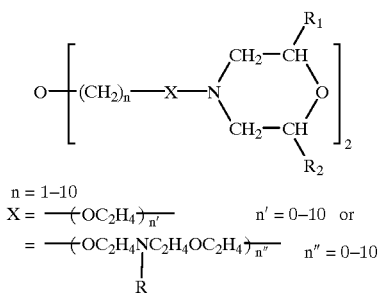

$$n = 1{-}10$$
$$X = -\!\!-\!\!(\text{OC}_2\text{H}_4)_{\overline{n'}}-\!\!- \qquad n' = 0{-}10 \text{ or}$$
$$= -\!\!-\!\!(\text{OC}_2\text{H}_4\text{NC}_2\text{H}_4\text{OC}_2\text{H}_4)_{\overline{n''}}-\!\!- \qquad n'' = 0{-}10$$
$$\phantom{= -\!\!-\!\!(\text{OC}_2\text{H}_4\text{N}}\underset{R}{|}$$

and mixtures thereof where $R_1$ and $R_2$ can be hydrogen or alkyl groups having 1–4 carbon atoms, R can be an alkyl group having 1–4 carbon atoms and n is an integer ranging from 1 to 10.

R, $R_1$, $R_2$ can be the same or different. When R, $R_1$, $R_2$ is an alkyl group, it can be methyl, ethyl, propyl, isopropyl, butyl and isobutyl. Preferabaly $R_1$ and $R_2$ are hydrogen, methyl, ethyl or propyl and R is methyl, ethyl or propyl. The more preferred catalysts comprise both ether and morpholine functional groups, with 2,2-dimorpholinoethyl ethyer and di(2,6-dimethyl morpholinoethyl)ether being the most preferred. An example of a useful catalyst is 4,4'-(oxydi-2,1-ethanediyl)bis-morpholine. This catalyst is otherwise known as DMDEE and is available under the tradename of Jeffcat™ DMDEE from Huntsman Corp. located in Houston, Tex. Other catalysts such as ethylene diamine and organo tin and bismuth catalysts such as dibutyl tin dilaurate and dibutyl tin diacetate are not as advantageous. In general, bismuth octoate, for instance, is a very good hot melt moisture cure catalyst, but is less stable during shipping and storage where the temperatures may reach about 65° C. Other catalysts include aliphatic titanates having from 1–12 carbon atoms such as lower alkyl titanates including tetrabutyl titanate and tetraethyl titanate, and amines. These catalysts are useful from about 0.01% to about 2% by weight in the one-part hot melt moisture cure polyurethane composition.

The polyurethane prepolymer component is useful from about 5% to about 95% by weight of the hot melt moisture cure polyurethane composition, preferably from about 5% to about 50% by weight, even more preferably from about 10% to about 85% by weight in the composition, even more preferably from about 15% to about 70% by weight and even more preferably from about 20% to about 50% by weight of the composition.

The thermoplastic component of the present invention may include any thermoplastic elastomer including rubber compounds such as block copolymers including those having the general configurations A-B-A triblock copolymers, A-B diblock copolymers, A-B-A-B-A-B multiblock copolymers, Y block copolymers, radial block copolymers and grafted versions thereof. The A block may be styrene and the B block may be isoprene, butadiene, ethylene/butylene and ethylene/propylene to name a few. The preferable thermoplastic rubber compounds of the present invention include isobutylene-isoprene rubber compounds often referred to as butyl rubber compounds, ethylene-propylene rubber compounds or mixtures thereof. Examples of useful thermoplastic rubber compounds include the Butyl™ Rubber series of butyl rubbers from Exxon Chemical Co. in Houston, Tex. such as Butyl™ 268 and Butyl™ 065 which are isobutylene-isoprene copolymers; the Vistalon™ series of ethylene-propylene copolymers from Exxon Chemical Co. such as Vistalon™ 404; the Kraton™ G series, styrene-ethylene/butylene-styrene block copolymers from Shell Chemical Co. in Houston, Tex. such as Kraton™ G-1652 and G-1657; the Kraton™ D, styrene-butadiene-styrene and styrene-isoprene-styrene block copolymers such as Kraton™ D-1111 and D-1112 from Shell Chemical Co. and Kraton SKFG101, a silane terminated block copolymer from Shell Chemical Co.; and the Vector™ series, styrene-butadiene-styrene and styrene-isoprene-styrene block copolymers such as Vector™ 4112, 4114 and 4411 from Dexco™ Polymers in Houston, Tex.

In a preferred embodiment of the present invention, the polyurethane prepolymer component is the reaction product of a polyisocyanate and at least one polyol formed from a diol and a diacid. Preferably, the diacids have a chain length of greater than about 10 carbon atoms. The thermoplastic component includes at least one rubber compound which preferably is an isobutylene-isoprene or butyl rubber compound or an ethylene-propylene rubber compound.

Other useful thermoplastic components include homopolymers, copolymers and terpolymers of ethylene; homopolymers, copolymers and terpolymers of propylene; homopolymers and copolymers of isobutylene; hydrogenated versions; and mixtures thereof.

Examples of other useful thermoplastic components include Rextac™ series of atactic polypropylene polymers such as Rextac™ RT 2535 and RT 2585 from Rexene Products Co. in Dallas, Tex.; the Eastoflex™ series of atactic polypropylene polymers from Eastman Chemical Co. in Kingsport, Tenn. such as Eastoflex™ E1060; the Epolene™ C series of polyethylene polymers from Eastman Chemical Co.; the Elvax™ series of ethylene vinyl acetate copolymers from DuPont de Nemours in Wilmington, Del.; the Ultrathene™ ethylene vinyl acetate copolymers from Millennium Petrochemicals in Rolling Meadows, Ill.; the Optema™ series of ethylene methyl acrylate copolymers from Exxon Chemical Co. in Houston, Tex.; the Lotryl™ series of ethylene n-butyl acrylate copolymers from Elf Atochem North America in Philadelphia, Penn. and the Escorene™ series of ethylene n-butyl acrylate copolymers from Exxon Chemical Co.; the Elvaloy™ series of ethylene n-butyl acrylate carbon monoxide terpolymers from DuPont and the Enathene™ ethylene n-butyl acrylate copolymers from Millennium Petrochemicals. Still other useful polymers include thermoplastic polyurethane polymers such as the Pearlstick™ polymers from Aries Technologies in Derry, N.H., a distributor for Merquinsa located in Barcelona, Spain; the Hytrel™ polymers, butylene/poly(alkylene ether) phthalates supplied by DuPont; ethylene acrylate copolymers from DuPont under the tradename of Elvaloy™; ethylene n-butyl acrylate carbon monoxide terpolymers also under the tradename of Elvaloy™ from DuPont and acrylic polymers such as those supplied by ICI Acrylics located in St. Louis, Mo. under the tradename of Elvacite™.

In one preferred embodiment of the present invention, the thermoplastic component includes at least one ethylene vinyl acetate copolymer.

A further category of useful thermoplastic polymers is homogeneous linear or substantially linear interpolymers of ethylene with at least one $C_3$ to $C_{20}$ alphaolefin, further characterized by each said interpolymer having a polydispersity less than about 2.5 including such polymers as Exact™ 5008, an ethylene-butene copolymer, Exxpol™ SLP-0394, an ethylene-propylene copolymer, Exact™ 3031, an ethylene-hexene copolymer, all available from Exxon Chemical Co. in Houston, Tex.; and ethylene/1-octene polymers are available under the tradenames of Affinity™, Insight™ and Engage™ and are all available from Dow Chemical Co. in Midland, Mich.

Other useful generic categories of polymers include polyisobutylenes, polyvinyl acetate polyamides, asphalts, bitumens, crude rubbers, fluorinated rubbers, polyvinyl chloride resins, polystyrene, cellulosic resins, ethylene propylene diene monomers and polyamides such as those supplied by the H. B. Fuller Co. in St. Paul, Minn.

The thermoplastic component of the present invention may contain tackifying resins which do not react with isocyanates. The tackifying resins useful herein may include aliphatic, cycloaliphatic and aromatic hydrocarbon resins and modified versions and hydrogenated derivatives thereof; and terpenes (polyterpenes) and modified terpenes and hydrogenated derivatives thereof and mixtures thereof Tackifying resins typically have a ring and ball softening point of between about 70° C. and 150° C. They are also available with differing levels of hydrogenation, or saturation, another commonly used term. Useful examples include Eastotac™ H-100, H-115, H-130 and H-142 from Eastman Chemical Co. in Kingsport, TN which are partially hydrogenated cycloaliphatic petroleum hydrocarbon resins with different softening points. These are available in the E grade, the R grade, the L grade and the W grade, having differing levels of hydrogenation from least hydrogenated (E) to most hydrogenated (W). Other useful tackifying resins include Escorez™ 5300 and Escorez™ 5400, partially hydrogenated cycloaliphatic petroleum hydrocarbon resins, and Escorez™ 5600, a partially hydrogenated aromatic modified petroleum hydrocarbon resin all available from Exxon Chemical Co. in Houston, Tex.; Wingtack™ Extra which is an aliphatic, aromatic petroleum hydrocarbon resin available from Goodyear Chemical Co. in Akron, Ohio; Hercolite™ 2100 which is a partially hydrogenated cycloaliphatic petroleum hydrocarbon resin available from Hercules in Wilmington, DE; Zonatac™ 105 Lite which is a styrenated terpene resin made from d-limonene and available from Arizona Chemical Co. in Panama City, Fla.; Regalrez™ 1094, an aromatic hydrogenated hydrocarbon resin available from Hercules; and Kristalex™ 3070, 3085 and 3100 alphamethyl styrene resins having softening points of 70° C., 85° C. and 100° C. available from Hercules. There are many types and grades of tackifying resins available from many companies. One skilled in the art would recognize that this is a representative rather than an exclusive list.

The compositions of the present invention may optionally contain a filler, including talcs, clays, silicas and treated versions thereof, carbon blacks and micas. Examples of such fillers include Mistron Vapor™ talc from Luzenac America, Inc. in Englewood, Colo.; Nytal™ 200, 300 and 400, different particle size grades of talc from R.T. Vanderbilt Co. in Norwalk, Conn.; Snobrite™ Clay, a Kaolin clay available from Evans Clay Co. in Mcintyre, Ga.; Cab-o-sil™ TS-720 famed silica available from Cabot Corp. in Tuscol, Ill. and Mineralite™ 3X and 4X micas, high compression strength glass beads and spheres, available from Mineral Mining Corp. Kershaw, S.C.

Calcium carbonates are also suitable provided they are first dried and the pH compensated for to prevent the filler from leaching into the thermoplastic moisture cure polyurethane composition and catalyzing unintended reactions.

Silane adhesion promoters may optionally be added to the composition of the present invention. Preferably, the silanes have high boiling points of greater than about 120° C. An example of a useful silane compound is Silquest™ Y 11597 from OSI Specialties Inc. in Dover, Ohio. Silane adhesion promoters are useful from about 0.01% to about 5% by weight in the one-part moisture cure polyurethane hot melt composition, preferably from about 0.01% to about 2% by weight, and more preferably from about 0.01% to about 1% by weight in the composition. Fluorocarbons may also be optionally added.

Plasticizers may be used in the thermoplastic component of the present invention. Useful plasticizers include mineral based oils and petroleum based oils, liquid resins, liquid elastomers, polybutene, polyisobutylene, phthalate and benzoate plasticizers and epoxidized soya oil. A plasticizer is broadly defined as a typically organic composition that can be added to the thermoplastics, rubbers and other resins to improve extrudability, flexibility, workability and stretchability in the finished adhesive. Any material which flows at ambient temperatures and is compatible in the compositions of the present invention may be useful. Preferably, the plasticizer has low volatility at temperatures of greater than about 85° C.

The most commonly used plasticizers are oils which are primarily hydrocarbon oils, low in aromatic content and are paraffinic or naphthenic in character. The oils are preferably low in volatility, transparent and have as little color and odor as possible. This invention also contemplates the use of olefin oligomers, low molecular weight polymers, vegetable oils and their derivatives and similar plasticizing oils. The only requisite is that the plasticizer does not react in the hot melt moisture cure composition. For instance, plasticizers or oils with —OH functionality or —COOH functionality will react causing undesirable results.

Examples of useful plasticizers include Calsol™ 5120, a naphthenic petroleum based oil available from Calumet Lubricants Co. in Indianapolis, Ind.; Kaydol™ White Mineral Oil, a paraffinic mineral oil available from Witco Corp. in New York, N.Y.; Parapol™ 1300, a liquid butene homopolymer available from Exxon Chemical Co. in Houston, Tex.; Indopol H-300, a liquid butene homopolymer, available from Amoco Corp. in Chicago, Ill.; Escorez 2520, a liquid aromatic petroleum based hydrocarbon resin with a pour point of 20° C., available from Exxon Chemical Co.; and Regalrez 1018, a liquid hydrogenated aromatic hydrocarbon resin with a pour point of 18° C., available from Hercules, Inc. in Chicago. One skilled in the art would recognize that any generic 500 second or 1200 second naphthenic process oil would also be useful.

Solid plasticizers may also be useful to the present invention. Examples of such plasticizers include Benzoflex™ 352, a 1,4-cyclohexane dimethanol dibenzoate, Benzoflex S-404, a glyceryl tribenzoate and Benzoflex™ S-552, a pentaerythritol tetrabenzoate all available from Velsicol Chemical Corp. in Rosemont, Ill. Another example of a useful solid plasticizer is dicylcohexylphthalate.

A small amount of wax may be used in the hot melt component of the present invention. Chlorez™ 700 DD, a chlorinated paraffin wax from Dover Chemical Corp. in Dover, Ohio is an example of a useful wax.

A stabilizer or antioxidant can also be added to protect the composition from degradation caused by reaction with oxygen induced by such things as heat, light or residual catalyst from the raw materials such as the tackifying resin. Such antioxidants are commercially available from Ciba-Geigy in Hawthorne, N.Y. and include Irganox™ 565, Irganox™ 1010 and Irganox™ 1076, all hindered phenolic antioxidants. These are primary antioxidants which act as free radical scavengers and may be used alone or in combination with other antioxidants such as phosphite antioxidants like Irgafos™ 168 available from Ciba-Geigy. Phosphite antioxidants are considered secondary antioxidants, are primarily used as peroxide decomposers and are generally not used alone, but are instead used in combination with other antioxidants. Other available antioxidants are Cyanox™ LTDP, a thioether antioxidant, available from Cytec Industries in Stamford, Conn., Ethanox™ 330, a hindered phenolic antioxidant, available from Albemarle in Baton Rouge, La. Many other antioxidants are available for use by themselves, or in combination with other antioxidants. These compounds are added to the hot melts in small amounts, up to about 2% by weight in the composition and have no effect on the physical properties of the adhesive.

Other compounds that also could be added that have negligible effects on the physical properties are pigments which add color, fluorescing agents, weatherability improvers such as ultraviolet (UV) absorbers like Tinuvin™ P, 327 and 328 from Ciba-Geigy and UV scavengers such as Tinuvin™ 770 from Ciba-Geigy, and odor masks to mention only a few. Additives such as these are known to one of skill in the art.

One skilled in the art would recognize that these compounds may be combined in endless ways depending on the physical characteristics which are desired. Typically, the thermoplastic component will comprise blends two or more of the above mentioned compounds.

The thermoplastic component is useful from about 5% to about 90% by weight of the hot melt moisture cure polyurethane composition, preferably from about 10% to about 90% by weight, even more preferably from about 15% to about 85% by weight, even more preferably from about 30% to about 80% by weight and even more preferably from about 50% to about 80% by weight of the composition.

The thermoplastic component and the atmospheric curing resin can comprise identical compositions such as high molecular weight silicon-terminated urethane prepolymers, silicon functionalized block copolymers and other urethane prepolymers.

While the choice of component, order of addition and addition rate can be left to the skilled adhesives chemist, generally the compositions of this invention can be made by preparing the isocyanate capped prepolymer and blending the prepolymer with the thermoplastic polymer base and any other optional ingredient that may be added. The prepolymer phase is typically prepared by reacting the polyol or polyols with at least one polyfunctional isocyanate compound at an elevated temperature of typically between about 40° C. and about 200° C. The polyols may first be introduced into a reaction vessel, heated to reaction temperatures and dried to remove ambient moisture absorbed by the polyols. The polyfunctional isocyanate compounds are then added to the reactor. The polyols are generally reacted with the isocyanate compounds at ratios that typically depend on the hydroxy and isocyanate functionality of the reactants. Typically the compounds are reacted at ratios which result in a reaction between isocyanate groups and hydroxy groups leaving essentially no residual hydroxy and minimal isocyanate functionality, typically less than 10% by weight of the prepolymer. Typically, the reaction between the polyol compounds and the isocyanate compounds is conducted at an OH:NCO ratio of between about 1.0:1.2 and 1.0:4.0 in order to obtain an NCO concentration in the final adhesive of about 1% to about 10% by weight. Typically, the prepolymer is titrated to measure residual concentration of isocyanate using ASTM D-2572–80 "Standard Method for Isocyanate Group and Urethane Materials or Prepolymers" to determine completion of the reaction.

The prepolymer composition or atmospheric curing resin can then be packaged in suitable moisture proof containers or immediately blended with other optional components to form the finished product which also may be packaged in suitable moisture proof containers.

The compositions cure by reaction with atmospheric or ambient moisture and/or oxygen to form a cross-lined thermoset elastomer which is temperature resistant. The compositions can be cured in the bond line using a variety of mechanisms. The curing reaction occurs between a compound having an available active hydrogen atom and the NCO groups of the polyurethane prepolymer. A variety of reactive compounds having free active hydrogens are known in the art including water, hydrogen sulfide, polyols, ammonia and other active compounds. These curing reactions may be carried out by relying on ambient moisture, or the active compounds may be added to the composition at the bond line. When the compositions react with water, urea groups are formed to provide a polyurethane-urea polymer.

The one-part thermoplastic moisture cure polyurethane composition may be used for adhering and for sealing substrates by applying the composition to a first substrate at an application temperatures from about 50° C. to about 150° C. (about 125° F. to about 300° F.), preferably from about 50° C. to about 120° C. and more preferably from about 60° C. to about 150° C. contacting the first substrate with a second substrate and allowing the composition to cure. These compositions may be applied where only one substrate is involved such as for any general sealant applications.

These compositions may be applied to the substrates in a variety of ways including extrusion. These methods are discussed in detail below. These compositions are particularly well suited for bonding glass and metal without the use of primers.

This one-part system has primeness adhesion to glass and metal, exhibiting no adhesive failure from glass at room temperature, when immersed in water and under heat and humidity (about 65° C. and 100% relative humidity). Other commercially available polyurethane based systems, prior to the present invention have required a primer coating to the glass or metal before good adhesion could be obtained. The novel one-part system of the present invention needs no primer therefore removing a step in the manufacturing process.

The one-part system provides the ease of handling the hot melt systems which rapidly cool to a solid allowing for immediate handling of an insulating glass (IG) unit, excellent bond strengths and excellent temperature (heat and cold) resistance provided by the chemical curing of the atmospheric curing resin which provides a permanent elastomeric bond. Additionally, the one-part system exhibits a rapid rate of set allowing for increased line speeds and increased production efficiency over two-part polyurethane systems. The compositions of the present invention may be used in the construction of IG units. IG units generally comprise at least one edge assembly (or assemblies) including spacers, and at least two glass panels. The sealant is disposed between the edge assembly and the glass panels and provides structural integrity to the unit, seals out moisture and prevents exchange of gases and resists environmental attack from water, UV rays and temperature extremes. The thermoplastic component with its rapid cooling to a solid, allows the immediate handling of an IG unit, while the chemical curing component provides a permanent elastomeric bond which is temperature resistant.

An IG unit may consist of either a single seal construction or a dual seal construction. In a single seal construction, one composition functions as both the vapor barrier and as the bonding component or sealant between the glass and spacer. The composition of the present invention is amenable to single seal construction, having both a low moisture vapor transmission rate and high ultimate bond strength.

In dual seal construction two different compositions are used. The first composition serves as the primary vapor barrier and the second composition acts as a sealant, referred to as the secondary seal, bonding the glass panels to the spacers. Generally, a polyisobutylene sealant will provide the vapor barrier and a polyurethane, polysulfide or silicone sealant will provide the ultimate bond between the glass panels and the spacer. The compositions of the present invention may be utilized as a primary vapor barrier and as a secondary seal.

These sealants may be applied to the spacers using either preformed rolls, hand gunning, automated three sided extrusion or automated coextrusion. The temperature of application is typically between about 50° C. to about 120° C., more typically between about 50° C. to about 150° C. and more typically between about 60° C. and about 150° C.

Preformed roll type spacers, which are employed either in single seal or in dual seal construction as the primary sealant are known, but are most commonly used in the single seal construction wherein both the sealant and the spacer are combined. This type of spacer is known from, for example, U.S. Pat. No. 4,831,799 to Glover et al. issued May 23, 1989 describing a dual seal construction and in U.S. Pat. No. 4,431,691 to Greenlee issued Feb. 14, 1984 describing a single seal construction.

The hand gun method may be used for either single seal or for dual seal constructions. In the hand gunned method, a composition which acts as a vapor barrier rather than as a sealant, is first applied to the sides of the spacer, generally by extrusion but it may be in preformed roll form as well, and the panels of glass are bonded to the spacer. This leaves a void between the two glass panels which is then filled with sealant either by trowelling, which requires that the sealant be dispensed manually from bulk dispensers by use of a gun, or alternatively the sealant may be dispensed robotically. The manual dispensers are manufactured by such companies as Industrial Machine Manufacturing Co. in Richmond, Va. or Graco Inc. in Minneapolis, Minn. and the robotic dispensers by Peter Lisec GmbH Glastechnische Industrie in Hausmening, Austria and Lenhardt Maschinenbau GmbH in Hamburg, Germany.

The three side extrusion method may also be used for either single seal or for dual seal constructions. However, the general practice is to single seal when extruding. Three side extrusion is accomplished either by using a linear method described in U.S. Pat. No. 4,546,723 to Leopold et al. issued Oct. 15, 1985 incorporated by reference herein, or by using a non-linear method. Using these methods, the sealant is applied to the spacer which is positioned between two glass panels creating the insulating glass assembly. Once the assembly is made, the composite is compressed by either a heated or a nonheated roller press. The surface temperature of the glass is typically between about 60° C. and 80° C. and sealed with pressure until the unit is a set thickness. The unit is then cooled to room temperature. If a vent hole has been used to reduce the internal pressure of the unit during the sealing process, this hole is then sealed. The IG units may also comprise three glass panels and two spacers. The combination of heat and compression is used to achieve the proper adhesion and the desired unit thickness. Glass Equipment Development Co. located in Twinsburg, Ohio also has equipment that can coextrude two sealants simultaneously for dual seal applications, such equipment being a new development in the industry.

The present inventors envision that the one-part thermoplastic moisture cure polyurethane composition may be used in all types of applications, particularly those requiring excellent adhesion to glass and metal such as for applications in the manufacture of automobiles, mass transportation vehicles and watercraft as well as in the building construction industry.

The following non-limiting examples further illustrate the invention.

EXAMPLES

Test Methods

1. Adhesive Failure From Glass (AFG)

Samples were prepared by bonding two pieces of glass which are 3×1×¼ inches in size, to an aluminum spacer 3 inches long and ½ inch wide. The composition was applied with a hot spatula at a temperature between about 120° C. and 130° C. in an amount to fully fill the channel created between the glass and the aluminum. Samples were generally conditioned for four weeks at 23° C. and 50% relative humidity before testing.

Testing began with subjecting the samples to room temperature conditions, 100% water immersion or heat and humidity (about 65° C. and 100% relative humidity). Samples were subjected to these conditions for one week. The samples were then tested for adhesion by pulling the glass pieces apart and recording any adhesive failure from the glass surface.

Results are reported as percent adhesive failure from glass (% AFG).

2. Tensile Strength

ASTM C 961 was used to determine the tensile strength of the compositions. The test was modified to allow a composition thickness of 0.040 inches and additional conditioning at 23° C. and 50% relative humidity.

Polyol 1

A polyol was prepared by reacting 290 grams of Empol™ 1018, an 18 carbon dimer acid available from Emery Division of Henkel Corp. located in Cincinnati, Ohio and 71 grams of neopentyl glycol were charged in a flask equipped with a mechanical stirrer and a Dean-Stark trap for collecting water from the condensation reaction. The reaction was carried out at 100° C. to 140° C. under a 28 in. Hg vacuum for 4–6 hours until the acid number was below 0.80. This produced a 55 hydroxyl number polyol.

Prepolymer 1

Polyol 1 was reacted with Isonate™ 2125M, a 1,1'-methylene bis(4-isocyanato) benzene at an NCO/OH ratio of 3.5 under a 28 in Hg vacuum at 70° C. to 110° C. for 1½ to 3 hours. This yielded a prepolymer with 7.0% NCO.

Polyol 2

The reactants, 290 grams of Empol™ 1061, a dimer acid available from the Emery Division of Henkel Corp. located in Cincinnati, Ohio, and 71 grams of neopentyl glycol were charged in a flash equipped with a mechanical stirrer and a Dean-Stark trap for collecting water from the condensation reaction. The reaction was carried out at 100° C to 140° C. under a 28 in Hg vacuum for 4–6 hours until the acid number was below 0.80. The resultant polyol had a hydroxyl number of 55.

Prepolymer 2

Polyol 2 was reacted with Isonate™ 2125M, a 1,1'-methylene bis(4-isocyanato) benzene, available from Dow Chemical Company in Midland, Mich., at an NCO/OH ratio of 2.5 under a 28 in Hg vacuum and a temperature of 70° C. to 110° C. for 1½ to 3 hours. This yielded a prepolymer with 4.8 % NCO.

Prepolymer 3

A mixture of 1078 grams of Voranol™ 220-056, a 2000 molecular weight polyether polyol, and Voranol™ 232-034, a 4900 number average molecular weight polyether polyol, both from Dow Chemical Co. in Midland, Mich. was reacted with 314 grams of Isonate 2125M, a 1,1'-methylene bis(4-isocyanato) benzene, for 1½ to 2 hours at a temperature between about 60° C. and about 80° C. under a vacuum of less than about 28 mm Hg at which point about 30 grams of Santicizer 261 benzophthalate plasticizer from Monsanto Chemical Co. in St. Louis, Mo. was added producing a prepolymer with 3.7% NCO.

Prepolymer 4

Rucoflex™ XS-5625-20, a 2-methyl(1,3-propane)/adipic acid polyester polyol from the Ruco Polymer Corp. in Hicksville, N.Y. was reacted with Isonate 2125M under the same conditions as the prepolymers above to produce a prepolymer with 1.6% NCO.

Prepolymer 5

A mixture of about 235 grams of Polymeg™ 3000, a 3000 number average molecular weight diol from Quaker Oats Chemicals, a subdivision of Great Lakes Chemicals in West Lafayette, Ind. was reacted with about 63 grams of Isonate™ 2125M for about 1½ to 2 hours at a temperature of about 60° C. to about 80° C. under a vacuum of less than about 28 mm Hg and then 6 grams of Silquest Y-1 1597 silane from OSI Specialties, Inc. in Danbury, Conn. was added and the reaction was continued under the above conditions from about 15 to 30 minutes producing a prepolymer with 3.2% NCO.

TABLE I

|  | 4332-22-5 | 4332-19-2 |
|---|---|---|
| Kraton SKFG 101 | 18.6% | 37.2% |
| Kraton G 1726 | 18.4 | — |
| Regalrez 1094 | 20 | 43.4 |
| Kaydol Oil | 12 | 7.8 |
| Kristalex 3070 | 8 | — |
| Prepolymer 1 | 23 | 11.6 |
| Tensile Strength PSI |  |  |
| 2 week cure | 74 | 16 |
| 4 week cure | N/D | N/D |
| Glass Bond Adhesion |  |  |
| % AFG |  |  |
| Room Temperature | 75 | 0 |
| Water Soak | 100 | 0 |
| Heat/Humidity | 100 | 100 |

N/D = Not Determined

TABLE II

Examples 1—12

| Example | 1 | 2 | 3 | 4 | 5 | 6 | 7 | 8 | 9 | 10 | 11 | 12 |
|---|---|---|---|---|---|---|---|---|---|---|---|---|
| Butyl 268 | 5 | 5 | 5 | 5 | 5 | 5 | 5 | 5 | 4.9 | 5 | 5.06 | 5 |
| Butyl 065 | 5 | 5 | 5 | 5 | 5 | 5 | 5 | 5 | 4.9 | 5 | 5.06 | 5 |
| Vistalon 404 | 8 | 8 | 8 | 8 | 8 | 8 | 8 | 8 | 7.98 | 8 | 8.1 | 8 |
| Eastoflex E1060 | 12.8 | 12.8 | 12.8 | 12.8 | 12.8 | — | 12.8 | 12.8 | 12.4 | 12.8 | 13 | 12.8 |
| Eastman D 161 | — | — | — | — | — | 12.8 | — | — | — | — | — | — |
| Eastotac H100R | 14 | 14 | 14 | 14 | 14 | 14 | — | 14 | 15.8 | 15.8 | 14.2 | 14 |
| Eastotac H115R | — | — | — | — | — | — | 14 | — | — | — | — | — |
| Elvax 46 | 4.8 | 4.8 | 4.8 | 4.8 | 4.8 | 4.8 | 4.8 | — | 4.7 | 4.8 | 4.9 | 4.8 |
| Elvax 46L | — | — | — | — | — | — | — | 4.8 | — | — | — | — |
| Mistron Vapor Talc | 27.5 | 27.5 | 27.5 | 27.5 | 27.8 | 27.5 | 27.5 | 27.5 | 27.3 | 27.5 | 28.7 | 29.3 |
| Chlorez 700 DD | 1.8 | 1.8 | 1.8 | 1.8 | 1.8 | 1.8 | 1.8 | 1.8 | 1.7 | — | — | — |
| Silquest Y 11597 | .4 | .4 | .4 | .4 | .1 | .4 | .4 | .4 | — | .4 | .7 | .4 |
| Irganox 1076 | .5 | .5 | .5 | .5 | .5 | .5 | .5 | .5 | .5 | .5 | .2 | .5 |
| Carbon Black | .2 | .2 | .2 | .2 | .2 | .2 | .2 | .2 | .2 | .2 | .08 | .2 |
| Prepolymer 2 | 20 | 20 | 20 | 20 | 20 | 20 | 20 | 20 | 19.7 | 20 | 20 | 20 |
| Tensile psi |  |  |  |  |  |  |  |  |  |  |  |  |
| 2 weeks | 42 | 52 | 49 | 53 | 36 | 44 | 58 | 39 | 43 | 38 | 50 | 43 |
| 4 weeks | 67 | 76 | 78 | 76 | 57 | 70 | 75 | 74 | 56 | 51 | 72 | 54 |
| Glass Bonds % AFG |  |  |  |  |  |  |  |  |  |  |  |  |
| Room Temp | 0 | 0 | 0 | 0 | 0 | 0 | 0 | 0 | 0 | 0 | 0 | 0 |
| Water Soak | 0 | 0 | 0 | 0 | 0 | 0 | 0 | 0 | 0 | 0 | 0 | 0 |
| Heat/Humidity | 0 | 0 | 0 | 0 | 0 | 0 | 0 | 0 | 25 | 0 | 0 | 0 |

TABLE III

Examples 13–22

| Example | 13 | 14 | 15 | 16 | 17 | 18 | 19 | 20 | 21 | 22 |
|---|---|---|---|---|---|---|---|---|---|---|
| Butyl 268 | 5.6 | 5 | 5.6 | 4.3 | — | — | — | 5 | 5.06 | 5 |
| Butyl 065 | 5.6 | 5 | 5.6 | 4.3 | — | — | — | 5 | 5.06 | 5 |
| Vistalon 404 | 9 | 8 | 9 | 7 | — | — | — | 8 | 8.1 | 8 |
| Vector D4114 | — | — | — | — | — | 40 | — | — | — | — |
| Vector D4113 | — | — | — | — | — | — | 40 | — | — | — |
| Eastoflex E1060 | 14.4 | 12.8 | 14.4 | 11.2 | — | — | — | 12.8 | 12.9 | 12.8 |
| Eastotac H100R | 15.6 | 14 | 15.8 | 12.2 | — | — | — | 14 | 14.2 | 14 |
| Regalrez 1018 | — | — | — | — | — | 18 | — | — | — | — |
| Escorez 1310 | — | — | — | — | — | 8 | — | — | — | — |
| Escorez 1304 | — | — | — | — | — | — | 40 | — | — | — |
| Elvax 46 | 5.4 | 4.8 | 5.4 | 4.2 | — | — | — | 4.8 | 4.9 | 4.8 |
| Iceberg Clay | — | — | — | — | 32.6 | — | — | — | — | — |
| Mistron Vapor Talc | 31.2 | 27.5 | 31 | 24.1 | — | 10 | — | 27.6 | 28.7 | 27.6 |
| Cab o Sil TS720 | — | — | — | — | 1.7 | — | — | — | — | — |
| Chlorez 700 DD | 2 | 1.8 | 2 | 1.6 | 44.6 | — | — | 1.8 | — | 1.8 |
| Silquest Y 11597 | .4 | .4 | .4 | .4 | — | — | — | .4 | .7 | .4 |

TABLE III-continued

Examples 13–22

| Example | 13 | 14 | 15 | 16 | 17 | 18 | 19 | 20 | 21 | 22 |
|---|---|---|---|---|---|---|---|---|---|---|
| Dynasilane Glymo | — | — | — | — | .03 | — | — | — | — | — |
| Irganox 1076 | .6 | .5 | .6 | .5 | — | — | — | .5 | .21 | .5 |
| Carbon Black | .2 | .2 | .2 | .2 | .37 | — | — | .2 | .09 | .2 |
| Kaydol Oil | — | — | — | — | — | 4 | — | — | — | — |
| DMDEE | — | — | — | — | — | — | — | — | .06 | .06 |
| Prepolymer 1 | 10 | 20 | — | — | 20 | — | — | — | — | — |
| Prepolymer 2 | — | — | 10 | 30 | — | — | — | — | 20 | — |
| Prepolymer 3 | — | — | — | — | 20.7 | — | — | — | — | — |
| Prepolymer 4 | — | — | — | — | — | — | 20 | — | — | — |
| Prepolymer 5 | — | — | — | — | — | — | — | 20 | — | 20 |
| Tensile psi | | | | | | | | | | |
| 2 weeks | 50 | 40 | 53 | 57 | 319 | 14 | 20 | 148 | 54 | 208 |
| 4 weeks | 54 | 60 | 61 | 90 | ND | 24 | 31 | 211 | 71 | 258 |
| Glass Bonds % AFG | | | | | | | | | | |
| Room Temp | 0 | 0 | 0 | 0 | 0 | 0 | 0 | 0 | 0 | 0 |
| Water Soak | 0 | 0 | 0 | 0 | 0 | 20 | 0 | 0 | 0 | 0 |
| Heat/Humidity | 0 | 0 | 0 | 25 | 25 | 28 | 25 | 0 | 0 | 0 |

TABLE IV

Examples 23–29

| Example | 23 | 24 | 25 | 26 | 27 | 28 | 29 |
|---|---|---|---|---|---|---|---|
| Butyl 065 | 18.1 | 20.7 | — | — | — | — | — |
| Vistalon 404 | — | 3.1 | — | — | — | — | — |
| Eastoflex E1060 | — | 9.4 | — | — | — | — | — |
| Eastotac H100R | 18.1 | 14.9 | — | — | — | — | — |
| Epolene C13 | — | — | 10 | — | — | — | — |
| Elvax 46 | — | 5 | — | 34 | — | — | — |
| Elvax 40W | 14 | — | — | — | 33 | 35 | — |
| EVA 33-400 | — | — | — | — | — | — | 35 |
| Iceberg Clay | 27.7 | 23.8 | — | — | — | — | — |
| Mistron Vapor Talc | — | — | 44.6 | 33 | 34 | 35 | 35 |
| Silquest Y 11597 | — | — | .9 | .7 | .7 | .6 | .6 |
| Chlorez 700 DD | 1.6 | 1.8 | — | — | — | — | — |
| Irganox 1076 | .3 | .3 | — | — | — | — | — |
| Carbon Black | .2 | .3 | — | — | — | — | — |
| Prepolymer 2 | 20 | 20.7 | 44.5 | 32.3 | 32.3 | 29.4 | 29.4 |
| Tensile psi | | | | | | | |
| 2 weeks | 48 | 49 | 425 | 131 | 175 | 236 | 195 |
| 4 weeks | 147 | 58 | 355 | 281 | 310 | 293 | 287 |
| Glass Bonds % AFG | | | | | | | |
| Room Temp | 0 | 0 | 0 | 0 | 0 | 0 | 0 |
| Water Soak | 0 | 0 | 0 | 0 | 0 | 0 | 0 |
| Heat/Humidity | 25 | 0 | 0 | 0 | 0 | 0 | 22 |

What is claimed is:

1. An insulating glass unit, comprising:
a) at least one edge assembly;
b) at least two glass panels; and
c) a polyurethane sealant, comprising the reaction product of:
  i) a moisture curing polyurethane prepolymer component comprising the reaction product of at least one isocyanate compound and at least one dihydroxy polyol selected from the group consisting of polyester polyols, polyether polyols, polyalkylene polyols and mixtures thereof; and
  ii) at least one thermoplastic component;

wherein said sealant is disposed between said edge assembly or assemblies and said glass panel and engages said edge assembly or assemblies and said glass panels.

2. The unit of claim 1 wherein said polyurethane prepolymer component further comprises from about 0.01% to about 2% by weight of said polyurethane prepolymer component of a catalyst.

3. The unit of claim 2 wherein said catalyst is selected from the group consisting of metals, metal salts and amines.

4. The unit of claim 3 wherein said catalyst is selected from the group consisting of:

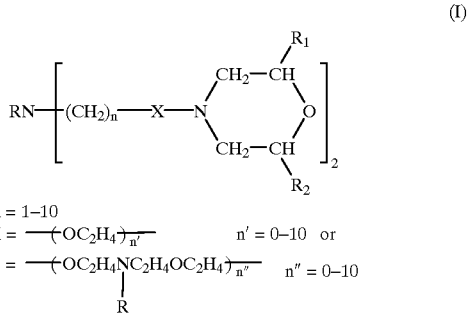

(I)

$n = 1\text{--}10$
$X = -(OC_2H_4)_{n'}- \quad n' = 0\text{--}10 \quad \text{or}$
$= -(OC_2H_4NC_2H_4OC_2H_4)_{n''}- \quad n'' = 0\text{--}10$
$\quad\quad\quad\quad |$
$\quad\quad\quad\quad R$

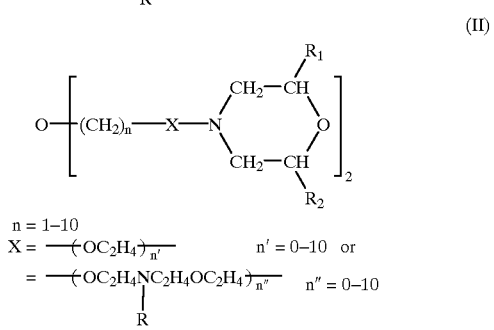

(II)

$n = 1\text{--}10$
$X = -(OC_2H_4)_{n'}- \quad n' = 0\text{--}10 \quad \text{or}$
$= -(OC_2H_4NC_2H_4OC_2H_4)_{n''}- \quad n'' = 0\text{--}10$
$\quad\quad\quad\quad |$
$\quad\quad\quad\quad R$ and mixtures thereof, where R can be an alkyl group having from 1–4 carbon atoms, $R_1$ or $R_2$ can be selected from the group consisting of hygrogen and alkyl groups having from 1–4 carobn atoms and n is an integer ranging from 1–10.

5. The unit of claim 1 wherein said edge assembly comprises a spacer selected from the group consisting of hollow tubes used to provide a fixed air space between the two glass panels and U-channels.

6. The unit of claim 1 wherein said sealant is applied to the spacer by a method selected from the group consisting of the preformed roll method, the hand gunned method, the three sided extrusion method and the coextrusion method.

7. The unit of claim 1 wherein said thermoplastic component comprises at least one compound selected from the group consisting of butyl rubber compounds; ethylene-propylene rubber compounds; ethylene vinyl acetate copolymers; homogeneous, linear or substantially linear interpolymers of ethylene and at least one $C_3$ to $C_{20}$ alphaolefin and mixtures thereof.

8. The unit of claim 1 wherein said sealant further comprises a silane adhesion promoter.

9. The unit of claim 1 wherein said sealant further comprises a filler selected from the group consisting of talcs, clays, silicas and treated versions, carbon blacks, micas and mixtures thereof.

10. A one-part thermoplastic moisture cure polyurethane composition, comprising:

a) at least one polyurethane prepolymer component comprising the reaction product of at least one polyisocyanate compound and at least one dihydroxy polyol selected from the group consisting of polyester polyols, polyether polyols, polyalkylene polyols and mixtures thereof;

b) at least one thermoplastic component; and c) at least one silane adhesion promoter having a boiling point of greater than about 120° C.;

wherein the one-part polyurethane hot melt composition has primeness adhesion to glass and metal.

11. The composition of claim 10 wherein said composition further comprises from about 0.01% to about 2% by weight of the composition of a catalyst.

12. The composition of claim 11 wherein said catalyst is selected from the group consisting of metals, metal salts, amines and mixtures thereof.

13. The composition of claim 12 wherein said catalyst is selected from the group consisting of:

$$RN \!\!-\!\! \left[ (CH_2)_n \!\!-\!\! X \!\!-\!\! N \!\!\begin{array}{c} CH_2\!\!-\!\!CH \\ \diagdown \\ CH_2\!\!-\!\!CH \end{array}\!\! \begin{array}{c} R_1 \\ \diagup \\ O \\ \diagdown \\ R_2 \end{array} \right]_2 \quad (I)$$

n = 1–10
X = $-\!(OC_2H_4)_{n'}\!-$     n' = 0–10 or
  = $-\!(OC_2H_4NC_2H_4OC_2H_4)_{n''}\!-$   n'' = 0–10
         |
         R

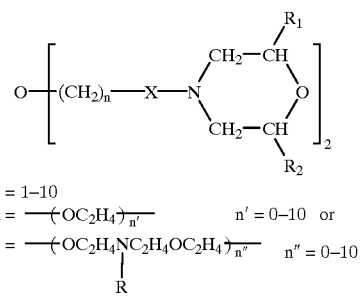

$$O \!\!-\!\! \left[ (CH_2)_n \!\!-\!\! X \!\!-\!\! N \!\!\begin{array}{c} CH_2\!\!-\!\!CH \\ \diagdown \\ CH_2\!\!-\!\!CH \end{array}\!\! \begin{array}{c} R_1 \\ \diagup \\ O \\ \diagdown \\ R_2 \end{array} \right]_2 \quad (II)$$

n = 1–10
X = $-\!(OC_2H_4)_{n'}\!-$     n' = 0–10 or
  = $-\!(OC_2H_4NC_2H_4OC_2H_4)_{n''}\!-$   n'' = 0–10
         |
         R and mixtures thereof,
where R can be an alkyl group having from 1–4 carbon atoms, $R_1$ or $R_2$ can be selected from the group consisting of hydrogen and alkyl groups having from 1–4 carbon atoms and n is an integer ranging from 1–10.

14. The composition of claim 10 wherein said polyurethane prepolymer component comprises the reaction product of at least one polyisocyanate compound and at least one amorphous polyester polyol formed from a diol and a diacid.

15. The composition of claim 14 wherein said diacid has a chain length greater than about 10 carbon atoms.

16. The composition of claim 14 wherein said thermoplastic component comprises at least one thermoplastic rubber compound selected from the group consisting of butyl rubber compounds and ethylene-propylene rubber compounds.

17. The composition of claim 10 wherein said thermoplastic component comprises at least one compound selected from the group consisting of butyl rubber compounds; ethylene-propylene rubber compounds; ethylene vinyl acetate copolymers; homogeneous, linear or substantially linear interpolymers of ethylene and at least one $C_3$ to $C_{20}$ alphaolefin and mixtures thereof.

18. The composition of claim 10 wherein said composition further comprises a filler selected from the group consisting of talcs, clays, silicas and treated versions thereof, carbon blacks, micas and mixtures thereof.

19. A sealant, for an insulating glass unit, comprising the composition of claim 10.

20. The composition of claim 10 comprising from about 0.1% to about 5% by weight of said silane adhesion promoter.

21. The composition of claim 10 wherein said silane adhesion promoter is tris-isocyanurate.

22. The composition of claim 10 wherein said dihyroxy polyol is a polyester polyol.

23. A one-part thermoplastic moisture cure polyurethane composition, comprising:

a) at least one polyurethane prepolymer component comprising the reaction product of at least one polyisocyanate compound and at least one dihydroxy polyol which is an amorphous polyester polyol formed from a diol and a diacid; and b) at least one thermoplastic component selected from the group consisting of butyl rubber compounds; ethylene propylene rubber compounds; block copolymers having an A block and a B block wherein said A block is styrene and said B block is selected from the group consisting of butadiene, ethylene/butylene, ethylene/propylene, isoprene; and mixtures thereof;

wherein said the one-part polyurethane hot melt composition has primerless adhesion to glass and metal.

* * * * *

UNITED STATES PATENT AND TRADEMARK OFFICE
CERTIFICATE OF CORRECTION

PATENT NO.  : 6,355,317 B1
DATED       : March 12, 2002
INVENTOR(S) : Kevin J. Reid, Anne E. Spinks and Jacqueline L. Jarosz It is certified that error appears in the above-identified patent and that said Letters Patent is hereby corrected as shown below:

<u>Title page,</u>
Item [75], Inventors: "Jacqueline J. Jarocz" should be -- Jacqueline L. Jarosz --

<u>Column 1,</u>
Line 40, "at each comer" should be -- at each corner --
Line 48, "continuous comers" should be -- continuous corners --

<u>Column 7,</u>
Line 24, "2,2-dimorpholinoethyl ethyer" should be -- 2,2-dimorpholinoethyl ether --

<u>Column 9,</u>
Line 46, "famed silica" should be -- fumed silica --

<u>Column 12,</u>
Line 15, "primeness adhesion" should be -- primerless adhesion --

<u>Column 18,</u>
Line 66, "carobn atoms" should be -- carbon atoms--

<u>Column 19,</u>
Lines 31-32, "polyisocy-canate compound" should be -- polyisocy-anate compound --

<u>Column 20,</u>
Line 48, "tris-isocyanurate" should be -- tris-[3-(Trimethoxysilyl)propyl]isocyanurate --
Line 49, "dihyroxy" should be -- dihydroxy --

Signed and Sealed this

Twenty-seventh Day of May, 2003

JAMES E. ROGAN
*Director of the United States Patent and Trademark Office*